United States Patent [19]
Narita et al.

[11] Patent Number: 5,524,176
[45] Date of Patent: Jun. 4, 1996

[54] FUZZY EXPERT SYSTEM LEARNING NETWORK

[75] Inventors: Kazunari Narita, Nagoya, Japan; Robert C. Lacher, Tallahassee, Fla.

[73] Assignees: Daido Steel Co., Ltd., Nagoya, Japan; The Florida State University, Tallahassee, Fla.

[21] Appl. No.: 205,483

[22] Filed: Mar. 4, 1994

Related U.S. Application Data

[63] Continuation-in-part of Ser. No. 138,847, Oct. 19, 1993, abandoned.

[51] Int. Cl.$^6$ .................................................. G06F 15/18
[52] U.S. Cl. ................... 395/22; 395/61; 395/3
[58] Field of Search ................... 395/22, 61, 3, 395/900

[56] References Cited

U.S. PATENT DOCUMENTS

| | | | |
|---|---|---|---|
| 4,326,259 | 4/1982 | Cooper et al. | 395/24 |
| 4,593,367 | 6/1986 | Slack et al. | 395/61 |
| 4,912,647 | 3/1990 | Wood | 395/23 |
| 4,912,649 | 3/1990 | Wood | 395/23 |
| 4,912,651 | 3/1990 | Wood et al. | 395/23 |
| 4,912,652 | 3/1990 | Wood | 395/23 |
| 4,912,653 | 3/1990 | Wood et al. | 395/23 |
| 4,912,654 | 3/1990 | Wood | 395/23 |
| 4,912,655 | 3/1990 | Wood | 395/23 |
| 4,914,603 | 4/1990 | Wood | 395/23 |
| 4,979,126 | 12/1990 | Pao et al. | 395/24 |
| 5,168,549 | 12/1992 | Takagi et al. | 395/21 |
| 5,175,797 | 12/1992 | Funabashi et al. | 395/22 |
| 5,255,344 | 10/1993 | Takagi et al. | 395/3 |

FOREIGN PATENT DOCUMENTS

| | | | |
|---|---|---|---|
| 0295876A2 | of 1988 | European Pat. Off. | G06K 9/64 |
| 2292602 | 12/1990 | Japan . | |
| 0492901 | 3/1992 | Japan . | |

OTHER PUBLICATIONS

Specht et al., "Probabalistic Neural Networks for Classification, Mapping, or Associative Memory", IEEE Inter. Conf. on Neural Networks, Jul. 1988.

Keller, "Fuzzy Logic Inference Neural Networks", SPIE vol. 1192 Intelligent Robots and Computer Vision VIII, 1989.

(List continued on next page.)

*Primary Examiner*—George B. Davis
*Attorney, Agent, or Firm*—Arnold, White & Durkee

[57] ABSTRACT

In the present invention, prior art techniques are extended to allow application of the backpropagation learning technique to artificial neural networks derived from fuzzy expert system rule-bases. A method in accordance with the invention, referred to herein as a Fuzzy Expert Network (FEN), is implemented in a programmed machine such as a computer to provide automated learning of both "fine" and "coarse" knowledge in a network of artificial neural objects (ANOs) implementing fuzzy modeling rules. Through application of the FEN method, an event-driven fuzzy expert network comprising acyclically connected ANOs derived from fuzzy modelling rules may be implemented. Neural objects implement one or more fuzzy combining and defuzzification rules and use backpropagation of error techniques to implement learning. As in prior art, the FEN allows each ANO to adjust its input weight parameters—"fine" knowledge learning. Unlike prior art, the FEN allows each ANO to modify its internal parameters—"coarse" knowledge learning. This latter action means that individual ANOs have the capability to modify the parameters of the fuzzy rule's membership function upon which they are based. In this way the FEN is able to change the structure of its encoded knowledge over time, making it a more adaptable architecture for autonomous and/or adaptable control systems. Simulation results showing the FEN's learning and adaptability behavior are given.

3 Claims, 13 Drawing Sheets

Microfiche Appendix Included
(35 Microfiche, 1 Pages)

OTHER PUBLICATIONS

Hayashi et al., "Systems Engineering Applications of Fuzzy Neural Networks", IJCNN, 7–11 Jun. 1992.

Hayashi, et al., "Fuzzy Neural Network with Fuzzy Signals and Weights" IJCNN, 7–11 Jun. 1992.

Enbutsu et al., "Fuzzy Rule Extraction from a Multilayered Neural Network", IJCNN, 8–14, Jul. 1991.

Horikawa et al., "On Fuzzy Modeling Using Fuzzy Neural Networks with the Back–Propagation Algorithm", IEEE Trans–On Neural Networks, Sep. 1992.

Sun, "Rule–Base Structure Identification in an Adaptive–Network–Based Fuzzy Interference System" IEEE Trans–On Fuzzy Systems, Feb. 1994.

Eshera, "Parallel Rule–Based Fuzzy Interference on Mesh–Connected Systolic Arrays" IEEE Expert, 1989.

K. Narita and R. C. Lacher, "FEN (Fuzzy Expert Networks) learning architecture," Proceeding of the 1993 International Joint Conference on Neural Networks, vol. II, pp. 1901–1905, Oct. 1993.

Chester, Lamb, and Dhurjati, *Rule–Based Computer Alarm Analysis in Chemical Process Plants*, Proceedings of 7th Annual Micro–Delcon '84, Mar. 1994, pp. 22–29.

Fu, *Integration of Neural Heuristics into Knowledge–Based Inference*, Connection Science, 1990.

Li Min Fu, *Rule Learning by Searching on Adapted NETS*, Proceedings of American Association of Artificial Intelligence Conference, 1991, pp. 590–595.

Hirota, K. and Pedrycz, W., *Fuzzy Logic Neural Networks: Design and Computations*, 1991 IEEE International Joint Conference on Neural Networks, vol. 1, 1991, pp. 152–175.

Kaihara, Koyama, Minamikawa, and Yasaka, *A Rule–Based Physicians' Consultation System for Cardiovascular Disease*, Proceedings of the International Conference on Cybernetics and Society, 1978, pp. 85–88.

Kuncicky, *The Transmission of Knowledge Between Neural Networks and Expert Systems*, Proceedings of the [First] Workshop on Neural Networks: Academic/Industrial/NASA/Defense, 1990, pp. 311–319.

Lacher, Hruska, and Kuncicky, *Backpropagation Learning in Expert Networks*, FSUCS Tech. 1991 Report 91–915, pp. 1–24.

Lacher, Hruska, Kuncicky, *Back–Propagation Learning in Expert Networks*, IEEE Transactions on Neural Networks, vol. 3, No. 1, 1992.

Lacher, Chapter 2: *Node Error Assignment in Expert Networks*, Intelligent Hybrid Systems, A. Kandel and G. Langholz, Eds. Boca Raton, FL., CRC Press.

Rumelhaart and McClelland, *Parallel Distributed Processing* vol. 1, Cambridge, MA, MIT Press, 1986, pp. 444–459.

Lacher, Hruska and Kuncicky, *Expert Networks: A Neural Network Connection to Symbolic Reasoning Systems*, Proceedings of the Fourth Florida Artificial Intelligence Research Symposium, Apr. 2–5, 1991, pp. 12–16.

Lacher, Hruska, Kuncicky, *Expert Networks: A Neural Network Connection to Symbolic Reasoning Systems* FSUCS Technical Report 90–092, Sep., 1990, pp. 1–28.

Kuncicky, Hruska, and R. C. Lacher, *Hybrid Systems: The Equivalence of Rule–Based Expert System and Artificial Network Inference*, Department of Computer Science, Florida State University, pp. 1–24.

Hruska, Kuncicky, and Lacher, *Learning in Acyclic Neural Networks*, FSUCS Technical Report 90–052, May 1990, pp. 1–4.

Hruska, Kuncicky, and Lacher *Learning in Acyclic Expert Networks*, Proceedings of the Second workshop on Neural Networks: Academic/Industrial/NASA/Defense, Feb. 11–13, 1991, vol. 1515, pp. 181–184.

Schwartz and Kir, *Fuzzy Logic Flowers in Japan*, IEEE Spectrum, Jul. 1992, pp. 32–35.

Munakata and Jani, *Fuzzy Systems:* An Overview, Communications of the ACM, Mar. 1994, vol. 37, No. 3, pp. 70–76.

Zadeh, *Fuzzy Logic, Neural Networks, and Soft Computing*, Communications of the ACM, Mar. 1994, vol. 37, No. 3, pp. 77–84.

FUZZY EXPERT SYSTEM LEARNING NETWORK

This application is a continuation in part of U.S. patent application Ser. No. 08/138,847, filed on Oct. 19, 1993, now abandoned.

1. REFERENCES

2. BACKGROUND OF THE INVENTION

Prior art includes two broad technologies for implementing and manipulating knowledge based systems on machines: expert systems and artificial neural networks. The basic concept underlying an expert system is that a collection of domain specific IF-THEN rules are used to manipulate input data to derive a solution. In general, one or more human experts are consulted about how to solve problems in the target domain, e.g., chemical process control [Chester, Lamb, and Dhurjati, "Rule-Based Computer Alarm Analysis in Chemical Process Plants," Proceedings of the Seventh Annual Conference on Computer Technology, March, 1984, pp. 158–163] or diagnosis of cardiovascular disease [Kaihara, Koyama, Minamikawa, and Yasaka, "A Rule-Based Physicians' Consultation System for Cardiovascular Disease," Proceedings of the International Conference on Cybernetics and Society, November, 1978, pp. 85–88]. Through these consultations, general rules about how the data associated with a particular problem should be manipulated are developed. These rules are eventually programmed into the machine so that, given a set of input data, the formulated rules can be applied to the data to yield a solution. As this discussion indicates, expert systems are generally associated with top-down knowledge engineering or deductive reasoning. In other words, to implement an expert system one must first have some previous information indicating how a problem should be solved or a model describing the problem's underlying process in terms of a set of rules.

In contrast to expert systems, artificial neural networks are generally associated with bottom-up or inductive learning. To construct a artificial neural network, one first constructs a network of "neurons" (processing elements or nodes) that receive input and produce an output in response to the input. In most artificial neural networks, the neurons assign differing weights to each input, combining the weighted inputs to produce an output. Once the basic artificial neural network is constructed, it is trained by providing it data representative of known problems and their known solutions. During this initial presentation process, the network repeatedly adjusts its weight values in accordance with predetermined feedback rules so that eventually it can produce an acceptable output for each set of known inputs. In this sense, the artificial neural network "learns" from the set of known problems and solutions.

2.1 Expert Systems

As used in this specification, an "expert system" is defined as comprising three functional and interacting components: a rule-base, an inference engine, and a cache. See FIG. 1. The rule-base 105 is a collection of rules which direct the expert system's manipulation of input data. The cache 110 provides a dynamic working memory for the expert system and the inference engine 115 applies incoming data to the rules within the rule-base and updates the state of the cache. Each of these components is discussed further below.

At present, there are two principal types of expert systems known in the prior art. The first, and more traditional, is the crisp expert system and the second is the fuzzy expert system. The terms "crisp" and "fuzzy" refer to the types of rules contained in the expert system's rule-base (the collection of rules used by the expert system).

A crisp rule has the form:

If a then b (cf), where a is the antecedent, b the consequent, and cf the certainty factor. For example, a human expert in the area of auto repair may posit a rule that 75% of the time if a car's wheels squeak then the brake pads need replacement. Thus, a crisp rule may be established indicating that if the brakes squeak (a) then the brake pads need replacing (b) with a certainty factor of 0.75 (cf). Certainty factors relate the quality, or certainty, of the assertion and, for the purposes of this discussion, are assumed to be restricted to the range [−1,1]—although the present invention may be practiced with other certainty factors.

Fuzzy rules and their associated fuzzy expert systems constitute an important aspect of the invention and are discussed in more detail below.

2.1(a) Fuzzy Rule Base

In contrast to a crisp rule with its implied absolute membership of the antecedent (the brakes either squeak, in which case the rule above would declare the brake pads need replacement with a certainty of 0.75 or they don't, in which case the rule would not activate), fuzzy rules employ linguistic variables to describe the relative membership of their antecedent. A linguistic variable has, as its value, words rather than numbers. Thus, the linguistic variable "pressure" might have the values of very_low, low, medium, and high. These four states are elements of the fuzzy set that describes the linguistic variable pressure.

Curves that relate each value of a linguistic variable to a measure (e.g., very_low, low, medium, and high to physical values of pressure) are known as "membership functions." Membership functions represent a generalization in the concept of set membership; larger values denote higher degrees of set membership. FIG. 2 shows one possible set of membership functions for the linguistic variable "pressure." Here, a measured pressure of $p_1$ has a membership of $m_{vl}$ in the value very_low and a membership of $m_l$ in the value low. Hence, the membership value of the antecedent variable (e.g., pressure) is no longer binary (YES/NO or 1/0) as it is in a crisp rule, it can now assume a spectrum of values defined by its "membership function."

Throughout this specification, membership functions are assumed to be symmetric triangular functions and normalized to the range [0,1]. The present invention may be practiced however with other values. For instance, membership functions could be trapezoidal or range between [−2,2]. Having noted this, it is important to realize that membership grades are not probabilities. One immediate difference is that the summation of probabilities on a finite universal set must equal one. There is no such requirement for membership grades.

A fuzzy rule, as used in this specification, is an IF-THEN rule in which the antecedent components are linguistic variables. (The term fuzzy relates to the use of linguistic variables). The form of such a rule, say rule-i, is:

If $x_1$ is $A_{i1}$ and . . . and $x_m$ is $A_{im}$ then y is $c_i$.

Here $x_1$ . . . $x_m$ represent real valued measures of 'm' linguistic variables (e.g., pressure, temperature, etc. ), $A_{i1}$ .

. . $A_{im}$ represent the antecedent membership functions for rule-i (e.g., symmetric triangular functions as shown in FIG. 2), y represents a real valued output variable, and $c_i$ represents the value assigned to y as a result of the rule. Output values are assumed to be restricted to the range [0,1] although other ranges may be used without departing from the inventive scope of the present invention.

A collection of fuzzy rules for use by an expert system, constitutes a fuzzy rule-base. In nearly all expert systems, rules are constructed to operate in a feed-forward manner in which no cycles occur among the expert system rules. That is, while the output of a rule in one layer may serve as an antecedent for a rule in a subsequent layer, the outputs for a rule in a subsequent layer do not serve as antecedents for rules in preceding layers.

2.1(b) Cache

The second element in many expert systems is known as the cache or working memory. Such a cache is figuratively illustrated as element 110 in FIG. 1. A cache functions as the dynamic working memory of the expert system. The current state of any active rule is stored in the cache along with information about the validity of the rule's antecedents (e.g., measured values of pressure or temperature).

2.1(c) Inference Engine

The inference engine is that part of the expert system that draws conclusions by manipulating rules from the rule-base and facts from the cache and updates the current values in the cache during processing. Even though it is usually superimposed on a clocked computer, this cache updating is naturally an event-driven computation.

In a fuzzy expert system the inference engine manipulates collections of fuzzy rules (also referred to as inference rules) according to a "compositional rule of inference." A compositional rule of inference is a procedure which describes how to combine (composite) different linguistic variables.

Because the combination of a number of linguistic variables is itself a linguistic variable, application of the compositional rule of inference needs to be followed by a technique to "defuzzify" its result—to generate a single output value which can, for example, be used to control a mechanical device. This latter procedure is known as defuzzification. The elementary operations employed in most compositional rules of inference, and defuzzification, are the arithmetic MAXIMUM and MINIMUM.

In FIG. 3, two hypothetical inference rules involving three variables are used to illustrate the compositional rule of inference and defuzzification methods used by a typical fuzzy expert system's inference engine. In this example the linguistic input variables are $x_1$ and $x_2$, the linguistic output variable is y, and the 'crisp' output value is denoted by c. (Example membership functions for the linguistic variables zero, small, medium and medium_large are shown in FIG. 3.) The fuzzy inference rules in this example are:

Rule 1: If $x_1$ is small and $x_2$ is small then y is medium_large

Rule 2: If $x_1$ is zero and $x_2$ is small then y is medium

Application of $x_1$ and $x_2$ to rule 1 results in the shaded portion of the rule's consequent membership function, medium_large 305, becoming activated: 1) input variable $x_1$ has a membership value $\alpha$ in the linguistic variable small 300; 2) this value maps to a value of $\alpha$ in rule 1's output linguistic variable medium_large 305; 3) input variable $x_2$ has a membership value $\beta$ in the linguistic variable small 300; 4) this value maps to a value of $\beta$ in rule 1's output linguistic variable medium_large 305; 5) the minimum of the rule's two antecedent values is used as the rule's output (vertically striped region of rule 1's consequent membership function 305).

In a similar manner, application of $x_1$ and $x_2$ to rule 2 results in the shaded portion of rule 2's consequent membership function, medium 315, becoming activated—horizontally striped region of rule 2's consequent membership function 315. Combining the output from rules 1 and 2 results in a temporary linguistic variable, fuzzy_result 320. (Temporary because it is only an intermediate step in the calculation and need not be stored in the cache for later use.)

This result is now defuzzified to generate a final, unambiguous, output c. One common defuzzification technique is the "centroid method." In this method the abscissa value corresponding to the center of gravity of the overlap region (the region common to both rule 1 and rule 2 output) is taken as the final output, c.

Of course the above example is an extremely simple one. In most fuzzy expert systems the number of antecedents will be much greater than two and the output state of one rule may serve as the input antecedent for another. In such systems, the modification of one antecedent almost always involves a recalculation of several other antecedents, an updating of these antecedent states in the cache, and a reapplication of the rules in the rule base to the updated antecedents.

2.2 Artificial Neural Networks

In contrast to the rule-based expert systems described above, most artificial neural networks consist of a number of artificial neural objects, sometimes referred to as nodes, processing units, or neurons, which receive input data, process that data, and generate an output signal. In such systems, the key to solving a problem lies not in a rule proclaimed by an expert but in the aggregate processing function of the many neurons which comprise the network.

As used herein, a network is a directed graph with weighted edges as shown in FIG. 4. In this example, input signals are applied to three nodes which, after processing, relay their results to other nodes. These nodes, in turn, process their input signals and pass along their results to still other nodes. The final output signal, in this example, is a combination of output from two nodes. A weighted link such as $w_{400 \rightarrow 410}$, connecting a source node 400 and a destination node 410, modifies the source node's 400 output signal before it is processed by the destination node 410.

In object-oriented programming, an object is characterized by a set of attributes describing its current state and a set of operations which can be applied to that object. In a similar fashion, an "artificial neural object" (ANO) may be defined as an artificial neuron—nodes 400 through 425 in FIG. 4—with its attendant states (e.g., idle or processing), input-output (I/O) facilities, and processes: incoming connections and connection strengths, combining function, output function, outgoing connections, and possibly a learning function, together with a communications facility to signal changes in processing state to adjacent nodes in the network. Precise specification of a communication facility for an ANO is dependent on the learning method imposed on the network and possibly other application-specific considerations. The exact nature of the combining and output functions is likewise variable.

A general, high-level description of an ANO's operational behavior is as follows. First, input signals are applied to the node and, possibly, modified by the weight of the connections over which they arrive. Next, the node's combining function combines the incoming signals to generate a value which becomes the node's new internal state value. Thirdly, the node's output function transforms the new internal state value to a possibly new output value which, through the node's communication facilities, it sends to other nodes for which it is the source of input. Based on other features of the network, a learning function may be employed to modify the node's input signal weights.

There is one specific type of ANO that is widely used in prior art artificial neural networks. The combining function for this ANO is the taking of a weighted sum of the inputs; the output function for this ANO is a sigmoidal (logistic) squashing function applied to the value of the weighted sums of the inputs. For the purposes of this specification, an ANO having a weighted sum combining function and a sigmoidal squashing output function, is referred to as an "analog perceptron."

In addition to the characteristics of an artificial neural network already cited, the invention makes use of an event-driven architecture as described by Lacher et al. [Lacher, Hruska, and Kuncicky, "Backpropagation Learning in Expert Networks," FSUCS Tech. Report, 91-015]. In general, the event-driven nature of an artificial neural network is similar in concept to that of data flow computing. In data flow computing, computational operations are ordered by the interdependencies of the data and the availability of resources rather than being specified entirely by the programmer. In other words, a computation proceeds form beginning to end based on the availability of needed data and the necessary computational resources such as a processing unit or memory.

2.2(a) Learning

As mentioned above, one important step to enabling an artificial neural network to solve a given problem is to teach the neural network by supplying it with known input with known output. During the training process, the artificial neural network learns to generate the correct output (known output) for the stimulus (known) input.

After enumerating the nodes in an artificial neural network, each node is assigned a "weight vector" whose components are the weights of its incoming edges. Each weight vector (one for each node) is a row in the network's "weight matrix." The value of the weight matrix—the value of each of its elements—at any given time is called the "knowledge state" of the network. The "weight space" of a node consists of all possible weight vectors. "Learning" is defined as a change in the network's knowledge state.

As set forth above, learning implies a change in knowledge. Generally speaking, artificial neural networks are said to represent knowledge in their connections. There are two levels on which to interpret such a statement. First, given a set of connections (a network topology), knowledge is stored in the synaptic functions. This is the more usual interpretation and is usually referred to as "fine" knowledge. In other words, fine knowledge is represented in an artificial neural network by the weights of the connections between the ANOs. Alternatively, the specification of just which connections exist could also fit this concept of knowledge in artificial neural networks. This is referred to as "coarse" knowledge.

Thus, coarse knowledge is captured in a network's topology, whereas fine knowledge is captured by the network's weight matrix—not merely the fact of connections but the strength of connections between different ANOs. Learning of coarse knowledge is associated with changes to the network topology while learning of fine knowledge (or knowledge refinement) involves changes to the synaptic functionalities. In either case, learning is represented by a change in the artificial neural network's configuration.

Fuzzy Rule 1 (If $x_1$ is small and $x_2$ is small then y is medium_large), introduced in Section 2.1(c), may be used to illustrate the difference between coarse and fine learning. Assume that an artificial neural network is established and that numerous known-correct cases have been applied where it has been proper to assert that output variable y is medium_large. After learning, the artificial neural network should establish a link between (1) the neurons responsible for indicating that input variables $x_1$ and $x_2$ are small and (2) the neuron responsible for indicating that output variable y is medium_large. Establishment of this link may be referred to as "coarse learning." Once coarse learning has been accomplished, the neural network must next determine what weight factors to assign to the output connecting these nodes. The determination of the exact weight factor to be applied to given inputs is referred to as "fine learning."

Learning of coarse knowledge could be loosely interpreted as rule extraction; a considerable body of research on this topic exists independent of neural networks. Some connectionist methods have also been introduced in recent years that build or modify network topology. While these methods are mostly not directed at high-level networks, where a single connection may be assigned meaning, some of them have potential in the realm of expert networks.

2.2(b) Backpropagation of Error

As previously cited, an artificial neural network must go through a learning process before it can accurately be used to solve problems. Although several procedures are available for training artificial neural networks, one of the most widely used is the backpropagation of error or simply, the backpropagation (BP) technique.

Backpropagation learning, more precisely described as gradient-descent supervised learning using backpropagation of error, has had a significant impact on the field of neural networks. BP involves comparing the actual output of an ANO with a known correct value to determine the error between the two values. That error is then sent back, or backpropagated, to the neurons that provided input to the neuron for which the error was calculated. In a similar manner, errors for each of those neurons is calculated and backpropagated to their input ANOs. This is repeated until each node in a network has received its backpropagated error.

Once each neuron receives its backpropagation error, it has an indication of both what its output value actually is and what that output value should be. Because the error for a given neuron is essentially a vector representing the erroneous weights given to its various input values, each node can be designed to (1) determine the gradient of the error vector and (2) determine in which direction it must change its weight vector to minimize the magnitude of the error vector. In other words, each neuron can be designed to determine the change in its weight vector that would tend to minimize the magnitude of the error vector the fastest, and then to change its weight vector in that direction. By periodically receiving error vectors, calculating the fastest way to minimize the magnitude of the error vector (i.e., calculating the error vector's gradient), and altering its weight vector, the ANOs of an artificial neural network can learn how to solve various problems.

Because of the need to backpropagate errors, many prior art BP learning methods typically depend on a layered feed-forward architecture that implicitly defines the role of time during both operational and learning phases. In other words, most artificial neural networks using BP divide the ANOs into separate layers and backpropagate the error from each layer to its predecessor through the use of a global clock.

One example of a layered network is shown in FIG. 5. As illustrated, the neural network is divided into four layers: I, II, III, and IV. A known input signal is applied to layer I and the network generates an output at layer IV: (1) an input signal activates layer I which results in output from layer I; (2) output from layer I activates layer II which results in output from layer II; (3) output from layer II activates layer III which results in output from layer III; (4) output from layer III activates layer IV which results in output from layer IV. The error for each ANO in layer IV is then calculated using the known and desired output and backpropagated to layer III. This process is repeated from layer III to II and layer II to I. By implementing backpropagation in this manner these layers impose what amounts to a global clock on the entire network.

Another feature typical of most prior art neural networks using BP learning is that the ANOs are almost always simple analog perceptrons. Although analog perceptrons are useful for solving many problems, they are often inadequate when more complicated types of neural networks are attempted to be implemented. A recent extension of the BP technique has allowed the use of backpropagation of error learning to be applied to artificial neural networks derived from traditional (e.g., non-fuzzy) expert system rule-bases using non-analog perceptron ANOs [Lacher, Hruska, and Kuncicky, "Backpropagation Learning in Expert Networks," FSUCS Tech. Report, 91-015].

In summary, although BP has been widely used in the prior art as a supervised learning paradigm, it has been applied almost exclusively to (1) layered, feed-forward networks of analog perceptrons and, most recently, (2) noncyclic, event-driven, artificial neural networks derived from conventional (e.g., non-fuzzy) expert system rule-bases.

3. SUMMARY OF THE INVENTION

In the present invention, the prior art techniques discussed above are extended to allow application of the BP learning technique to artificial neural networks derived from fuzzy expert system rule-bases, including an important and non-obvious extension necessitating the definition of new operational characteristics for ANOs. A method in accordance with the invention, referred to herein as a Fuzzy Expert Network (FEN), is implemented in a programmed machine such as a computer to provide automated learning of both "fine" and "coarse" knowledge in a network of artificial neural objects (ANOs) implementing fuzzy modeling rules.

Through application of the FEN method, an event-driven fuzzy expert network comprising acyclically connected ANOs derived from fuzzy modelling rules may be implemented. Neural objects implement one or more fuzzy combining and defuzzification rules and use backpropagation of error techniques to implement learning. As in prior art, the FEN allows each ANO to adjust its input weight parameters—"fine" knowledge learning. Unlike prior art, the FEN allows each ANO to modify its internal parameters—"coarse" knowledge learning. This latter action means that individual ANOs have the capability to modify the parameters of the fuzzy rule upon which they are based, thus altering the shape or meaning of the fuzzy rule which the ANO implements. In this way the FEN is able to change the structure of its encoded knowledge over time, making it a more adaptable architecture for autonomous and/or adaptable control systems.

4. BRIEF DESCRIPTION OF THE DRAWINGS

5. DETAILED DESCRIPTION OF SPECIFIC EMBODIMENT

One illustrative embodiment of the invention is described below as it might be implemented on a general purpose computer using a suitable high-level language such as C, Pascal, or Fortran. It will of course be appreciated that in the development of any such actual implementation (as in any software development project), numerous implementation-specific decisions must be made to achieve the developers' specific goals, such as compliance with system- and business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Microfiche Appendix A sets out source code for one illustrative example of the invention. Microfiche Appendix A is contained on one sheet of microfilm and contains a total of 35 frames.

An artificial neural network in accordance with the present invention, referred to herein as a Fuzzy Expert Network (FEN), utilizes the concept of an artificial neural object (ANO) to construct a network whose structure (topology) is determined by the knowledge and logical relationships expressed in a fuzzy expert system's (fuzzy) rule-base. Unique features of the FEN include:

1. Definition of a set of ANOs that are both necessary and sufficient to capture the knowledge and logical relationships described in a fuzzy rule.
2. A method of translating a fuzzy rule to an artificial neural network composed of the invention's defined ANOs.
3. An ability to apply the Backpropagation (BP) learning technique to the FEN. Using BP, nodes within a FEN have the facility to modify both their output weighting factors (as done in prior art artificial neural networks) and a node's operational parameters (novel to the FEN method). This latter feature allows a FEN node to modify the semantic, or functional characteristics, of a node's combining and output functions. This latter feature enables a FEN node to adaptively (in response to supplied input/output signals) alter the way in which it processes incoming signals. This is in contrast to prior art artificial neural networks, that only modify the relative weighting factors of a node's output signals.

5.1 Fuzzy Modeling

As introduced in Section 2.1(a), the generic form of a fuzzy rule, say rule number 'i' is:

Rule-i: If $x_1$ is $A_{i1}$ and ... and $x_m$ is $A_{im}$ then y is $c_i$, where $x_1 \ldots x_m$ represent m input variables, $A_{i1}$ represents rule i's antecedent membership function for input variable $x_1$, $A_{im}$ represents rule i's antecedent membership function for input variable $x_m$, and $c_i$ represents the output value assigned to output variable y as a result of rule-i.

Figure 1:
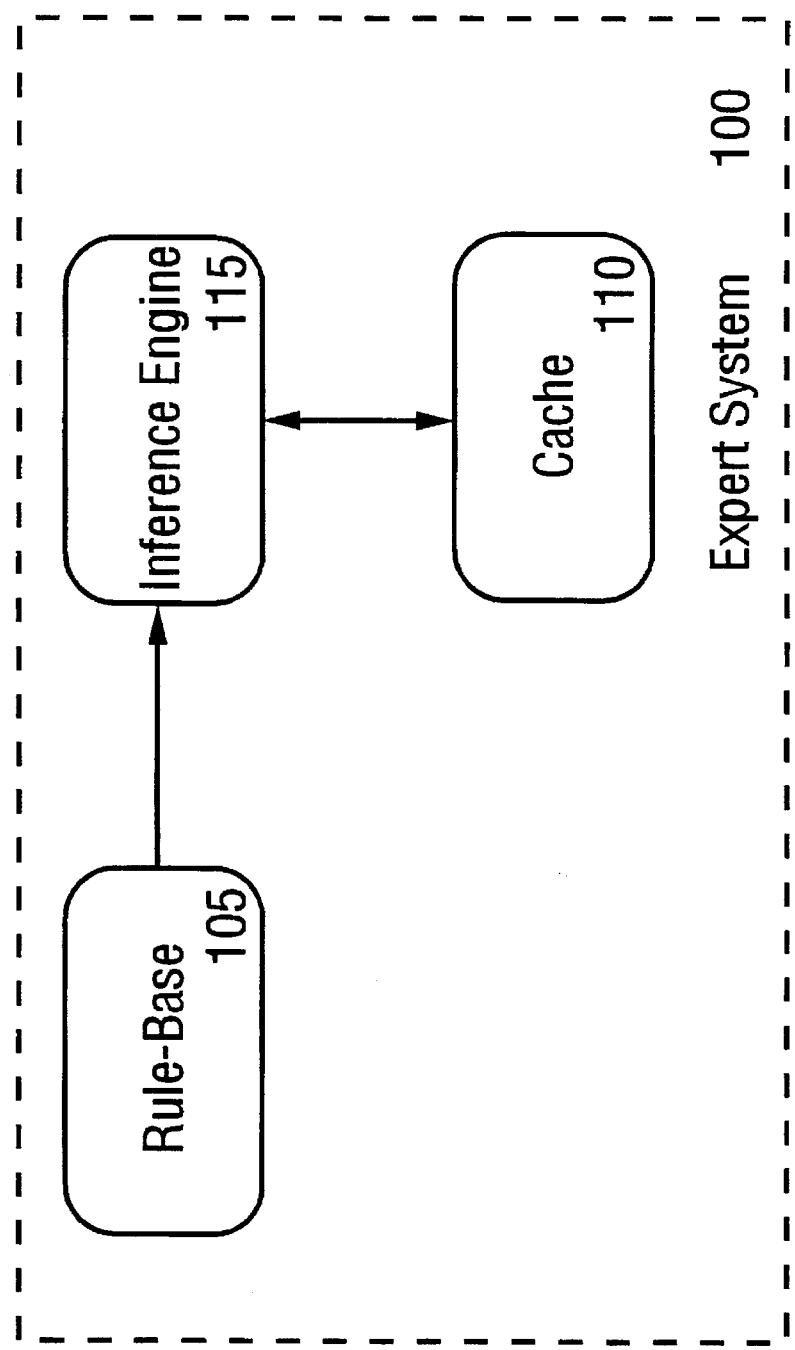
FIG. 1 is a block-diagram representation of a typical expert system.
Figure 2:
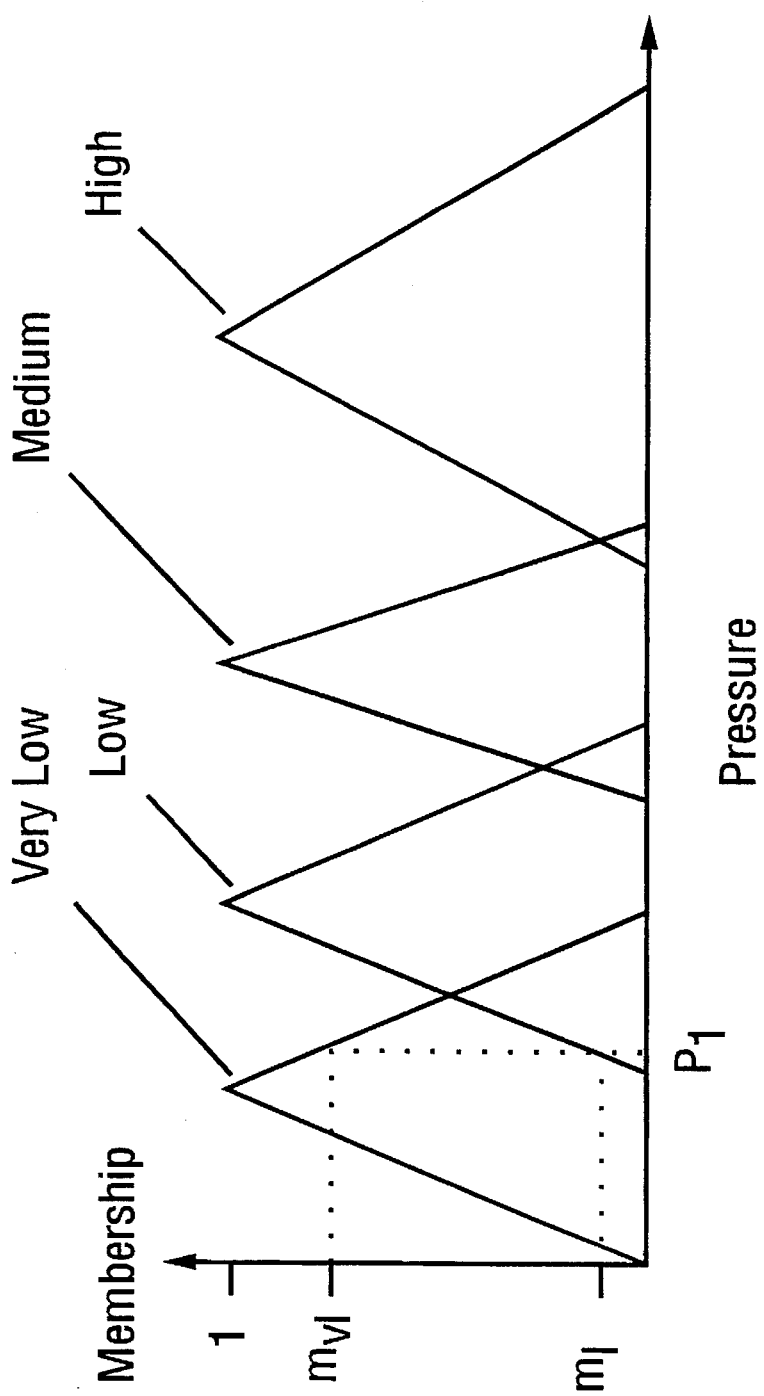
FIG. 2 is an illustrative example of a typical fuzzy rule's membership function.
Figure 3:
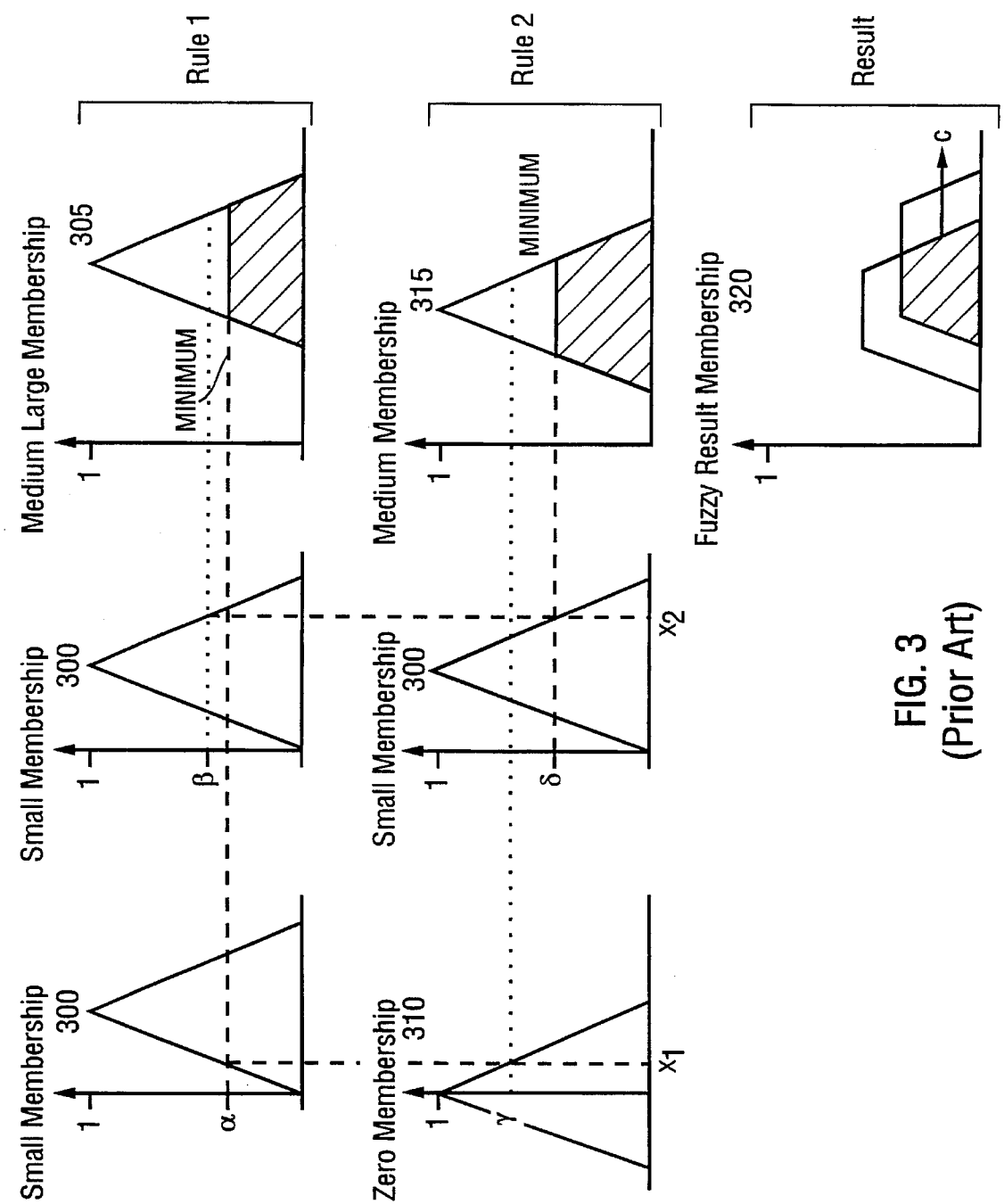
FIG. 3 is an illustrative example of a typical fuzzy expert system's compositional rule of inference.
Figure 4:
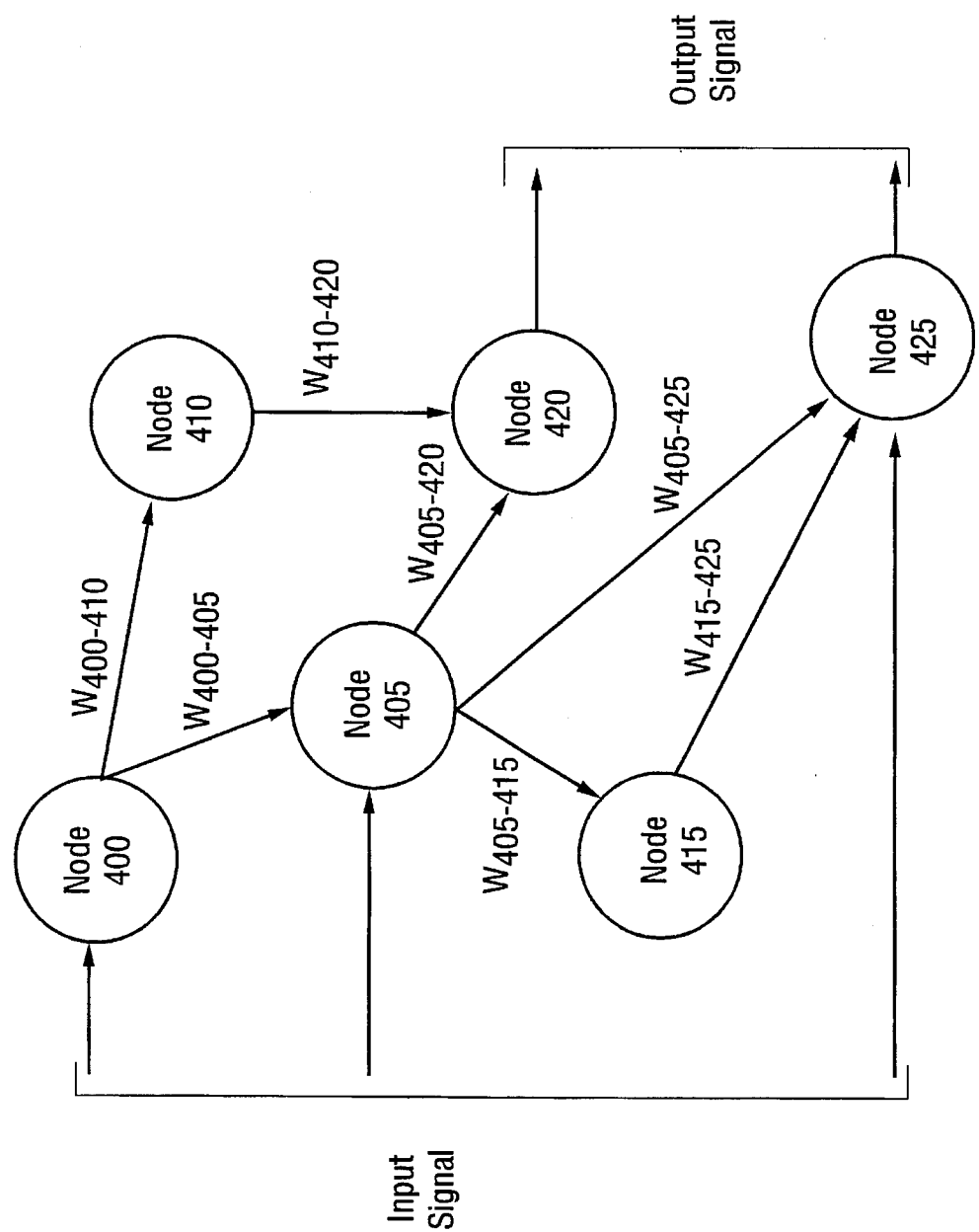
FIG. 4 is a block-diagram representation of an example artificial neural network.
Figure 5:
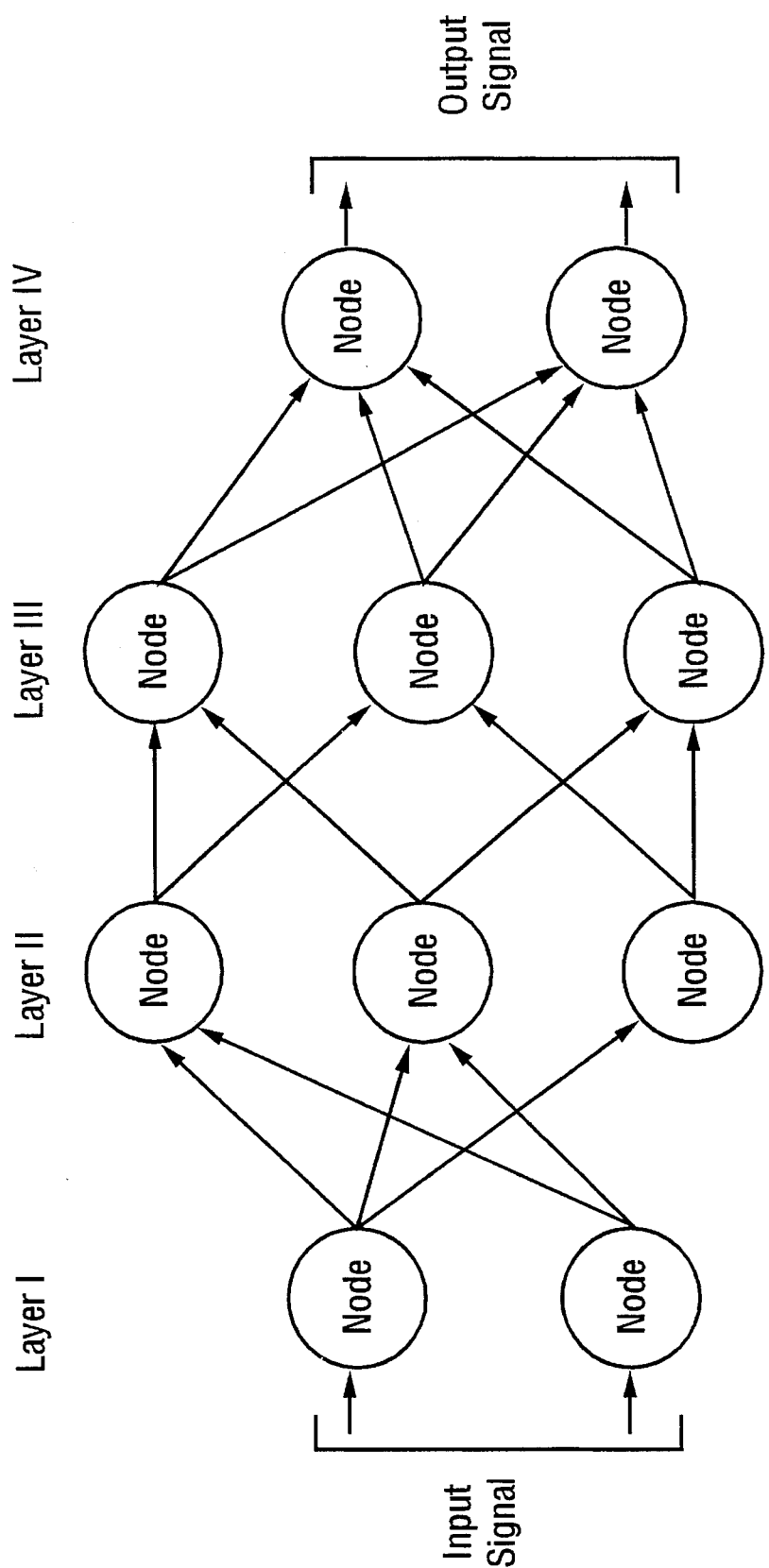
FIG. 5 is a block-diagram representation of a typical 'layered' artificial neural network.
Figure 6B:
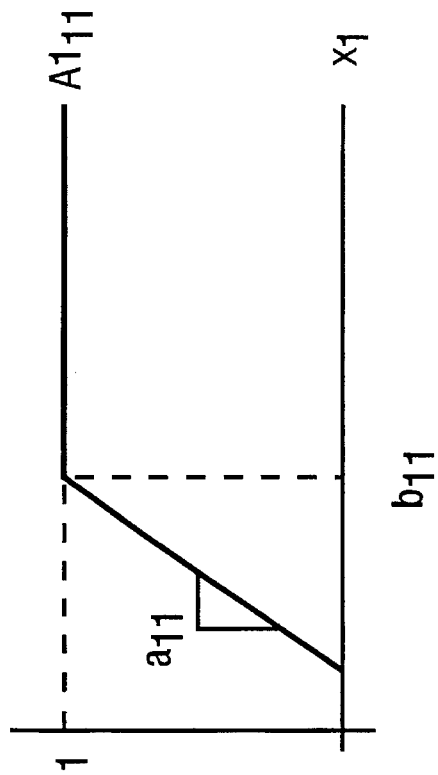
FIGS. 6A, 6B, 6C and 6D show a symmetric triangular membership function of a fuzzy rule's antecedent part.
Figure 6A:
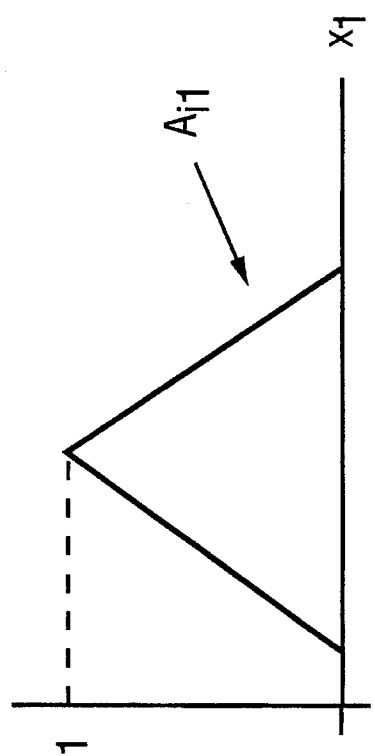

The invention utilizes a widely known simplified fuzzy inference model whose fuzzy rule consequences are described with singletons (unitary real values) and whose fuzzy rule antecedent membership functions have a symmetric triangular shape as shown in FIG. 6A. In this example, membership function $A_{ij}$ has an antecedent whose shape is symmetric and triangular and can, therefore, be described as the product of two linear threshold functions, $A1_{ij}$ and $A2_{ij}$. For example, if $A1_{ij}(x_j) = (((a_{ij}(x_j - b_{ij}) + 1) \vee 0) \wedge 1)$, and $A2_{ij}(x_j) = (((-a_{ij}(x_j - b_{ij}) + 1) \vee 0) \wedge 1)$, then $A_{ij}(x_j) = A1_{ij}(x_j) A2_{ij}(x_j)$.

Figure 6D:
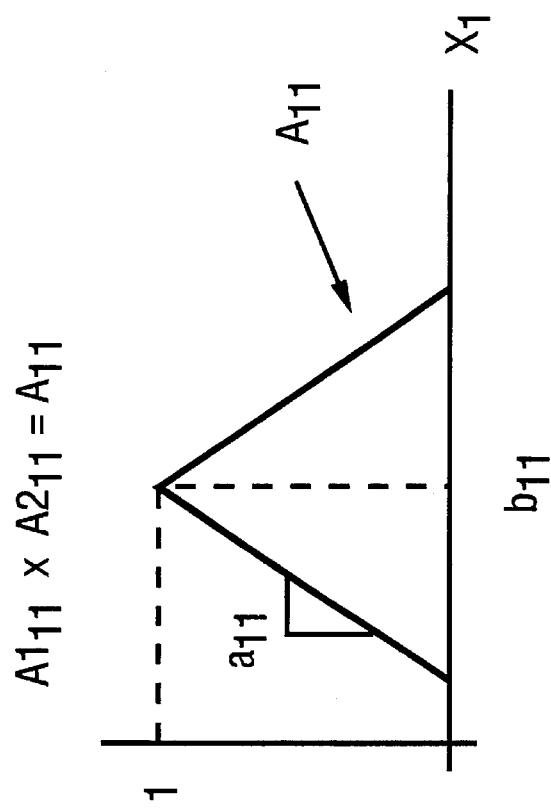
Figure 6C:
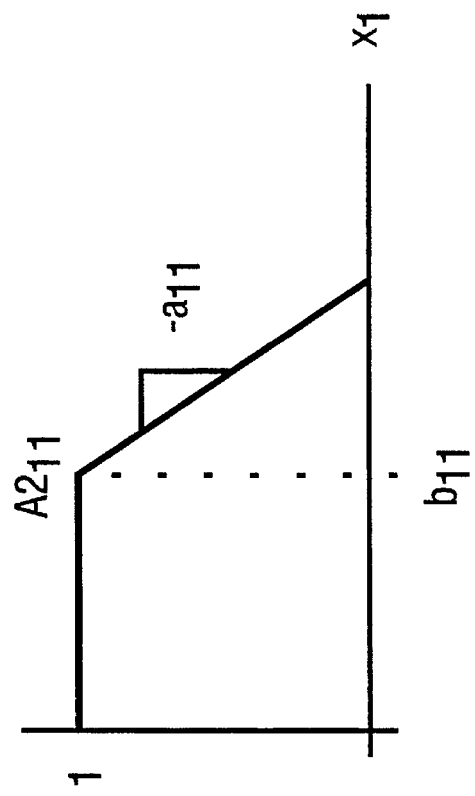

Here, $A1_{ij}(x_j)$ represents one linear threshold function for rule-i's $j^{th}$ input variable $x_j$ (FIG. 6B), $A2_{ij}(x_j)$ represents a second linear threshold function for rule-i's $j^{th}$ input variable $x_j$ (FIG. 6C), $a_{ij}$ is the positive gradient (slope) of rule-i's $j^{th}$ input variable's ($x_j$) antecedent membership function, $b_{ij}$ is the center value of rule-i's $j^{th}$ input variable's ($x_j$) antecedent membership function, $A_{ij}(x_j)$ is rule-i's complete antecedent membership function for input variable $x_j$ (FIG. 6D). V represents the logical OR operator and $\wedge$ represents the logical AND function.

5.2 Node Definitions

In an event-driven artificial neural network, an n-input "node" is defined to be a processing element consisting of the following attributes:

1. 'N' real-valued connection strengths, one for each input signal, $w_1, \ldots, w_n$ represented in vector notation as $w = (w_1, \ldots, w_n)$.
2. 'N' real-valued input signals $x_1, \ldots, x_n$ represented in vector notation as $x = (x_1, \ldots, x_n) = (z_1 w_1, \ldots, z_k w_k, \ldots, z_n w_n)$, where $z_k$ is node k's output value.
3. A combining function $\Gamma(x)$ that determines the node's internal state $y = \Gamma(x)$, based on the its input signal and connection strength parameters.
4. An output function $\phi(y)$ that determines a single output value $z = \phi(y)$ from the node's internal state y.

If the combining function $\Gamma(x)$ is the summation function and the output function $\phi(y)$ is the sigmoidal squashing function, the node is referred to as an analog perceptron.

With this background, a sufficient and necessary set of node (artificial neural objects) types for implementing an artificial neural network derived from a fuzzy expert system whose rule-base contains 'n' rules (a fuzzy expert network) can be defined.

5.2(a) SUM Node

The SUM node's combining and output functions are defined by $\Gamma_{sum}(x)$ and $\phi_{sum}(y)$ respectively where, $\Gamma_{sum}(x) = y = \Sigma_{i=1 \to n} x_i, \phi_{sum}(y) = y$.

For notational convenience let $SUM(x) = \phi_{sum}(\Gamma_{sum}(x))$.

5.2(b) LINEAR THRESHOLD Node

The LINEAR THRESHOLD node's combining and output functions are defined by $\Gamma_{lin}(x)$ and $\phi_{lin}(y)$ respectively where, $\Gamma_{lin}(x) = y = \Sigma_{i=1 \to n} x_i + 1$, $\phi_{lin}(y) = 1$ if $y \geq 1$;
$\quad\quad\quad = y$ if $0 \leq y < 1$,
$\quad\quad\quad = 0$ otherwise.

For notational convenience let $LIN(x) = \phi_{lin}(\Gamma_{lin}(x))$.

5.2(c) PRODUCT Node

The PRODUCT node's combining and output functions are defined by $\Gamma_{prod}(x)$ and $\phi_{prod}(y)$ respectively where, $\Gamma_{prod}(x) = y = \Pi_{i=1 \to n} x_i, \phi_{prod}(y) = y$.

For notational convenience let $PROD(x) = \phi_{prod}(\Gamma_{prod}(x))$.

5.2(d) WEIGHTED-SUM-GRAVITY Node

The WEIGHTED-SUM-GRAVITY node is used to defuzzify the output resulting from fuzzy rule activation (refer to Section 2.1). This node's combining and output functions are defined by $\Gamma_{grav}(u)$ and $\phi_{grav}(y)$ respectively where, $\Gamma_{grav}(u) = y = \Sigma_{i=1 \to n}(u_i \times c_i) \div \Sigma_{i=1 \to n} u_i, \phi_{grav}(y) = y$, where u represents a vector of fuzzy rule outputs (one element—$u_i$—for each fuzzy rule involved in the output y) and $c_i$ represents the weight factor of rule-i's output in the final "defuzzified" output, $\phi_{grav}(y) = y$. For notational convenience let $GRAV(u) = \phi_{grav}(\Gamma_{grav}(u))$.

5.2(e) INPUT Node

The INPUT node is used as a notational convenience to represent an externally supplied input signal to the FEN. This node has no combining function and its output function $\phi_{in}(x_i)$ is the unitary multiplier, $$\phi_{in}(x_i)=x_i.$$

For notational convenience let $INP(x_i)=\phi_{in}(x_i)=x_i$.

5.3 Building a Fuzzy Expert Network

Through the practice of the present invention, an artificial neural network can be constructed from any fuzzy rule-based expert system. While the details of the construction may vary somewhat from application to application, the general principle is to interconnect ANOs of the types defined in Section 5.2 to represent each rule in the fuzzy rule-base. Thus, the FEN's topology is determined by the knowledge contained in the fuzzy expert system.

The conversion of a fuzzy expert system rule-base to a fuzzy expert network is accomplished via a two step process. First, each fuzzy rule is decomposed into the product of two linear threshold functions as described in Section 5.1. Secondly, the appropriate fuzzy rule outputs are combined and defuzzified for each output variable defined in the original fuzzy expert system.

It is assumed in the following discussion that the given fuzzy expert system uses fuzzy rules whose antecedent's membership functions are 1) symmetric and triangular and 2) normalized to the range [0, 1]. Values in square brackets, e.g., [$a_{ij}$], represent values that are eligible for modification through application of a learning method, see Section 5.4. Input variables are assumed to be restricted to the range [−1, 1]. Other values and types of antecedent membership function may be used without departing from the inventive concept of the invention.

5.3(a) Membership Function of the Antecedent Part

Using the ANO definitions introduced in Section 5.2, the two linear threshold functions that together make up a triangular membership function can be expressed in the following manner (refer to Section 5.1 and FIG. 6):

$$A1_{in}(x_j) = LIN(a_{ij}(x_j - b_{ij}))$$
$$LIN(SUM(a_{ij}(x_j - b_{ij})))$$
$$LIN(SUM(SUM(x_j - b_{ij})a_{ij}))$$
$$A1_{in}(x_j) = LIN(SUM(SUM(INP(x_j),INP(-1)[b_{ij}])[a_{ij}])),$$

where the notation SUM(a, b) implies SUM(a)+SUM(b); if either 'a' (or 'b') is a scalar value then SUM(a)≡a (SUM(b)≡b).

Making the same set of substitutions for $A2_{in}(x_j)$ yields, $$A2_{in}(x_j)=LIN(SUM(SUM(INP(x_j), INP(-1)[b_{ij}])[a_{ij}])(-1)).$$

The product of $A1_{in}(x_j)$ and $A2_{in}(x_j)$ is a formula for fuzzy rule-i's antecedent membership function for input variable $x_j$:

$$A_{in}(x_j)=PROD(A1_{in}(x_j), A2_{in}(x_j)),$$

where the notation PROD(a, b) implies (a×b).

Figure 7:
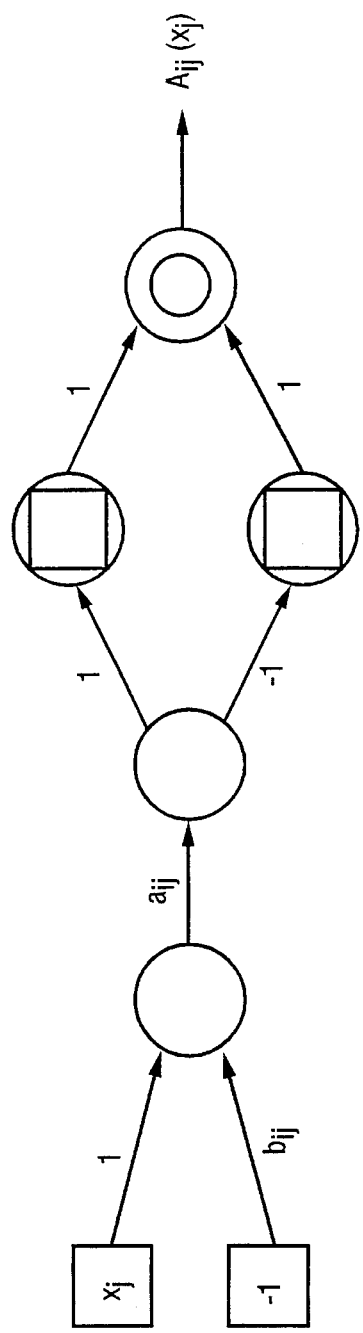
FIG. 7 is a block diagram representation of the invention's network structure for a fuzzy rule's antecedent part.

FIG. 7 is a schematic of the fuzzy modeling function $A_{in}(x_j)$ used in the FEN. In FIG. 7, and all subsequent figures: a square symbol denotes an input, INP( ), node as described in Section 5.2(e); a circle symbol denotes a sum, SUM( ), node as described in Section 5.2(a); a circumscribed-square symbol denotes a linear threshold, LIN( ), node as described in Section 5.2(b); and a double-circle symbol denotes a product, PROD( ), node as described in Section 5.2(c). As introduced earlier (see FIG. 6 and Section 5.1), $a_{ij}$ is the positive gradient (slope) of rule-i's $j^{th}$ input variable's ($x_j$) antecedent membership function and $b_{ij}$ is the center value of rule-i's $j_{th}$ input variable's ($x_j$).

5.3(b) Defuzzification of Rule Output

Defuzzification is a process which translates the combination of a rule's antecedent parts to a single, real value. As introduced earlier, a rule may have a number of antecedent parts. If $u_i$ represents the output of rule-i, having 'm' antecedent parts, then $$i\ u_i=A_{i1}(x_1)\times A_{i2}(x_2)\times \ldots \times A_{im}(x_m),$$

or alternatively, $$u_i=PROD(A_{i1}(x_1), A_{i2}(x_2), \ldots, A_{im}(x_m)).$$

If the combination of 'n' rules generate an output z, then defuzzification in the FEN uses the WEIGHTED-SUM-GRAVITY function to combine these 'n' fuzzy rule outputs to produce a single, 'crisp', output. Letting the vector v represent the n-tuple product $(u_1\times c_1, u_2\times c_2, \ldots, u_n\times c_n)$, then $$z=GRAV(v).$$

Figure 8:
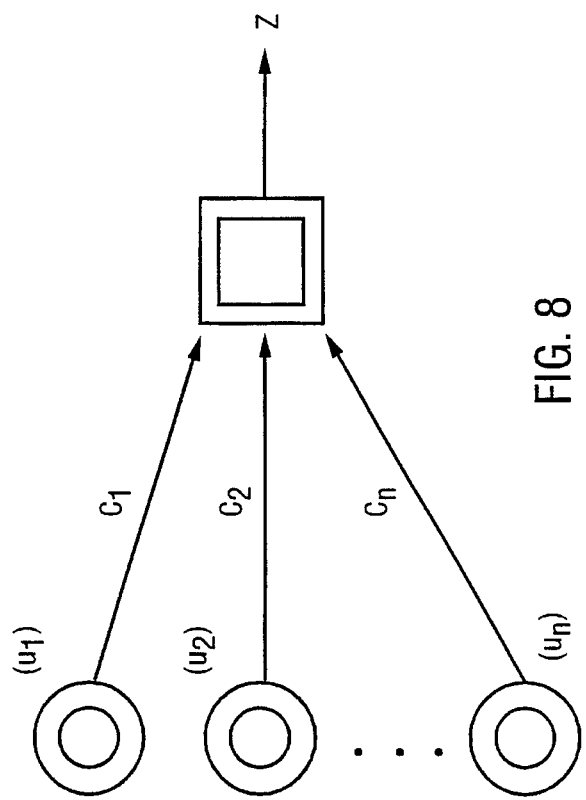
FIG. 8 is block diagram representation of the invention's "defuzzification" process.

FIG. 8 is a schematic of the defuzzification process captured in the above equation; a double-square symbol represent the GRAV( ) function. In the FEN, there is one defuzzification element for each output variable in the modeled system. For instance, if a specific FEN implementation is designed to control a single motor that requires three inputs, then the FEN will have three GRAV( ) elements.

5.3(c) Example FEN

As an illustrative example of how to convert a fuzzy rule-base into an artificial neural network structure—a FEN—consider a fuzzy expert system with two input variables, $x_1$ and $x_2$ and two membership functions (symmetric and triangular) of the antecedent parts for each input. The four rules that comprise this sample fuzzy expert system rule-base are shown in Table 1.

Figure 9:
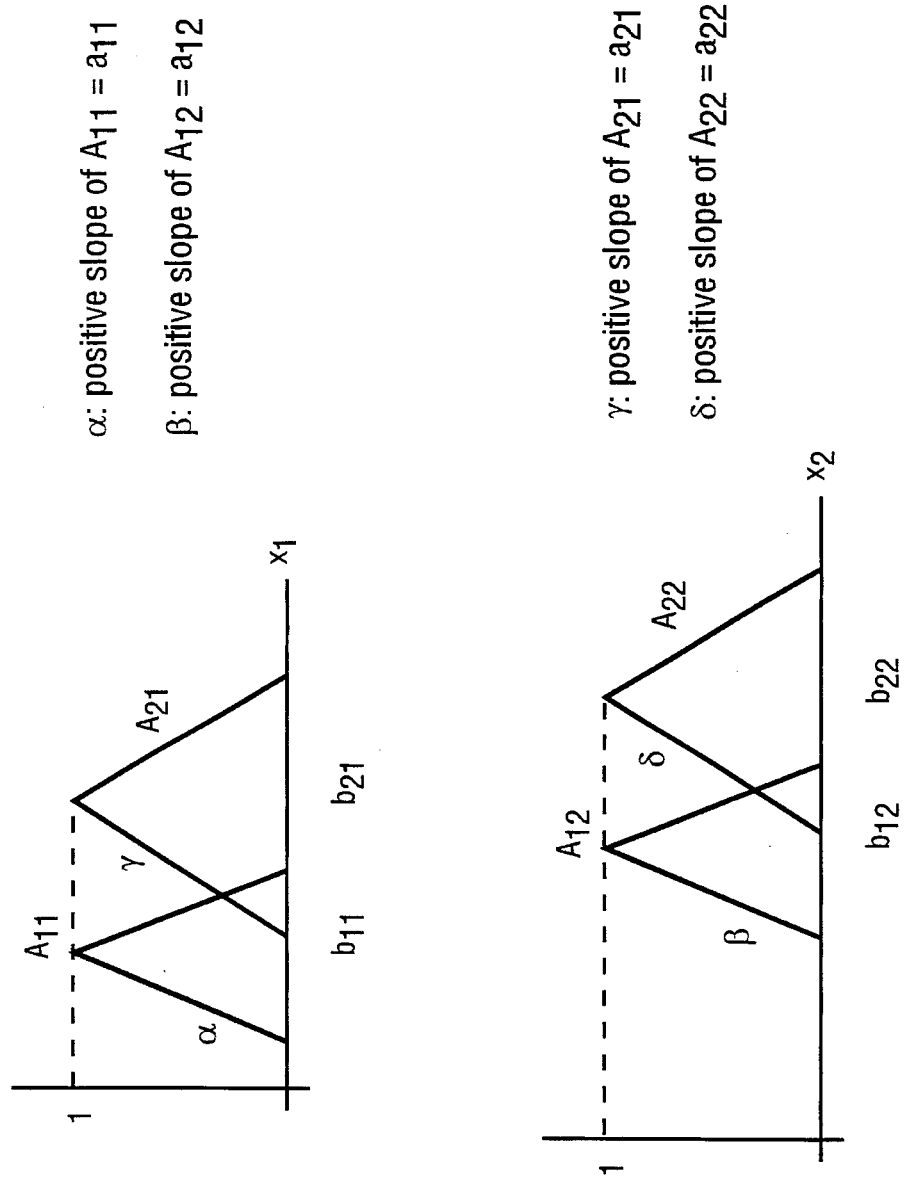
FIG. 9 show the structure of an example two input, four rule fuzzy rule-base.

Assume that the example FEN generates a single output signal that is a weighted combination of the four rules given in Table 1. FIG. 9 shows a graphical representation of the four rules' antecedent parts.

TABLE 1

| Sample Fuzzy Expert System Rule-Base | |
|---|---|
| Rule | Expression |
| 1 | if $x_1$ is $A_{11}$ and $x_2$ is $A_{12}$ then $c_1$ |
| 2 | if $x_1$ is $A_{11}$ and $x_2$ is $A_{22}$ then $c_2$ |
| 3 | if $x_1$ is $A_{21}$ and $x_2$ is $A_{12}$ then $c_3$ |
| 4 | if $x_1$ is $A_{21}$ and $x_2$ is $A_{22}$ then $c_4$ |

The artificial neural network for each rule is identical in structure to that shown in FIG. 7 and described in Section 5.3(a). Output for each rule formed by multiplying the outputs from each of the rules antecedent parts. For instance, $u_1 = PROD(A_{11}(x_1), A_{12}(x_2))$, $u_2 = PROD(A_{11}(x_1), A_{22}(x_2))$, $u_3 = PROD(A_{21}(x_1), A_{12}(x_2))$, and $u_4 = PROD(A_{21}(x_1), A_{22}(x_2))$.

Finally, the output z is generated by taking the weighted product of each rule, that is:

$z = GRAV(u_1 \times c_1, u_2 \times c_2, u_3 \times c_3, u_4 \times c_4)$.

Figure 10:
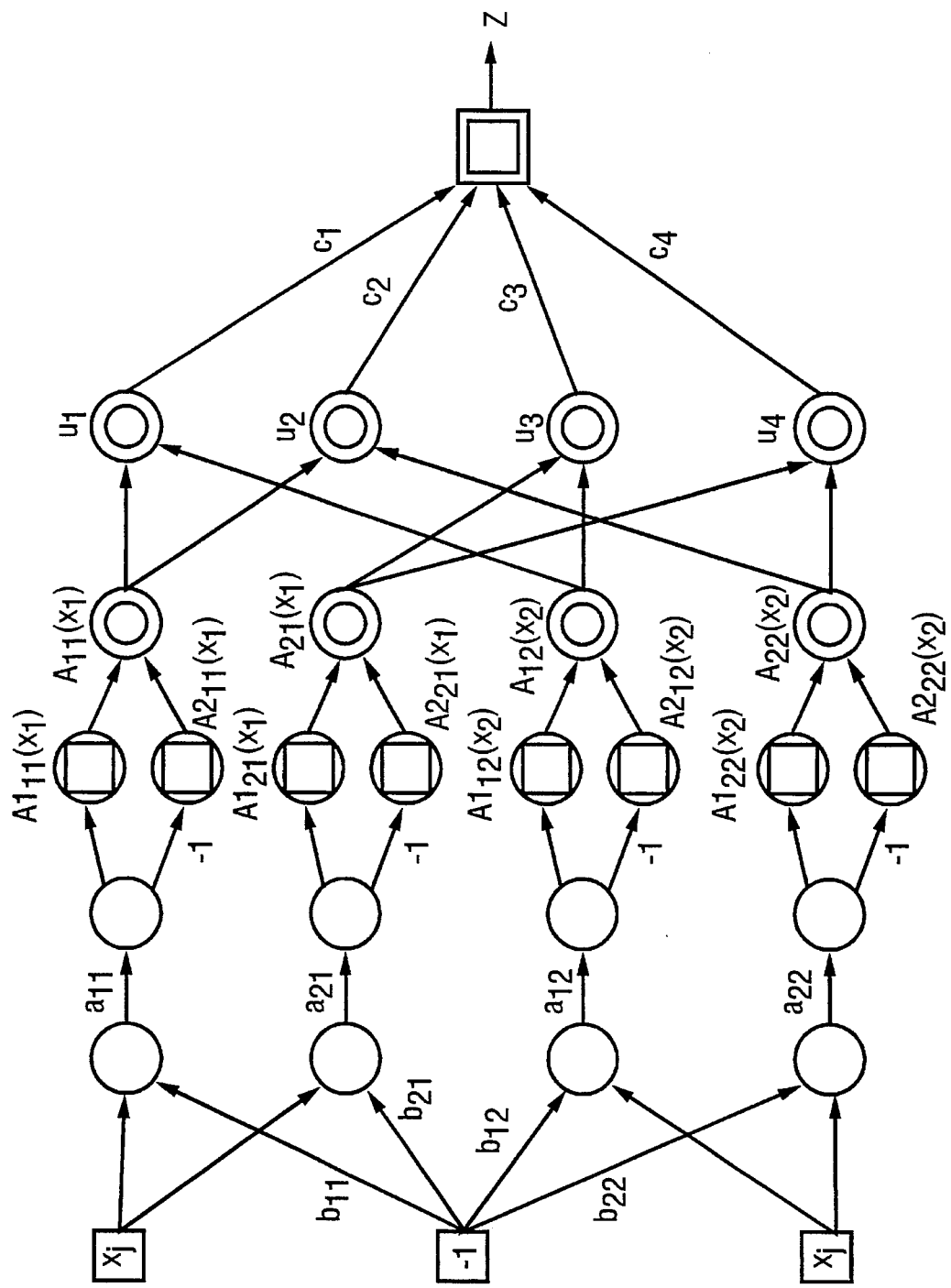
FIG. 10 is a block diagram representation of the inventions network structure for the fuzzy rule-base of FIG. 9.

The network representation of the four rules listed in Table 1—using the ANO definitions described earlier—and z calculated above is shown in FIG. 10. (In FIG. 10, connections not labeled have a weight value of 1). In Section 5.5 a numerical example will be introduced to show how backpropagation learning is applied to a FEN to allow modification of the network weight values, $a_{ij}$, $b_{ij}$, and $c_i$ —learning.

5.4 Backpropagation Learning in the FEN

Well known in the field of artificial neural networks is the application of backpropagation learning (BP) to layered networks of feed forward analog neurons [Rumelhart and McClelland, "Parallel Distributed Processing," Cambridge, Mass., MIT Press, 1986, pp. 444–459]. More recently, application of BP to artificial neural networks derived from non-fuzzy expert system rule-base's has been shown [Lacher, Hruska, Kuncicky, "Back-Propagation Learning in Expert Networks," IEEE Transactions on Neural Networks, vol. 3, no. 1, 1992], [Lacher, "Node error assignment in expert networks" in Intelligent Hybrid Systems, A. Kandel and G. Langholz, Eds. Boca Ratan, Fla., CRC Press].

During learning in a FEN, an ideal output I is assumed for each output ANO and defined for each non-output ANO. Thus, for an output ANO j, the error $e_j$ may be defined as the difference between the ideal output and the actual output for that ANO:

$e_j = I_j - z_j$, where $z_j$ is the calculated output from node j as previously described.

Using the concept of an "influence factor," denoted by $\epsilon$ (originally introduced by Lacher et al.), the error at a non-output ANO $e_j$ (e.g., an ANO which does not have a defined ideal output value) can be described as:

$e_j = \Sigma_{k=1 \rightarrow n} \epsilon_{kj} \times e_k$.

Here, ANO k is the successor node to ANO j, $\epsilon_{kj}$ is a weight distribution factor called the "influence factor," and the index k runs from 1 to n where n is the number of nodes that ANO j sends its output to. Lacher et al. further defines the influence factor $\epsilon_{kj}$ to be:

$\epsilon_{kj} = \phi'(y_k)[\partial \Gamma(x_{k1}, \ldots, x_{kn})/\partial x_{kj}]w_{kj}$, where $\epsilon_{kj}$ represents the influence factor between node j and the ANOs' that node j sends its output to, $x_{kj}$ represents the signal from ANO j to ANO k, $w_{kj}$ represents the weight of the connection between ANO j and ANO k, $\phi'(y_k)$ represents the derivative of ANO k's output function—at its current input value, and $\partial \Gamma( )/\partial x_{kj}$ represents the partial derivative of ANO k's combining function with respect to the connection between node j and node k. Values for $\phi'(y_k)$ and $\partial \Gamma( )/\partial x_{kj}$ are given by the following equations.

1. For the SUM node:

$\phi'(y_k) = 1$ and $\partial \Gamma/\partial x_{kj} = 1$.

2. For the LINEAR THRESHOLD node:

$\phi'(y_k)$ = 0 if $y_k > 1$
= 1 if $0 < y_k \leq 1$
= 0 otherwise and $\partial \Gamma/\partial x_{kj} = 1$.

3. For the PRODUCT node:

$\phi'(y_k) = 1$ and $\partial \Gamma/\partial x_{kj} = \Pi_{i=1 \rightarrow n} x_{ki}$ where $i \neq j$.

4. For the WEIGHTED-SUM-GRAVITY node:

$\phi'(y_k) = 1$ and $\partial \Gamma/\partial x_{kj} = (\Sigma_{i=1 \rightarrow n} x_{ki}/w_{ki})^{-1} - (1/w_{kj}) \times (\Sigma_{i=1 \rightarrow n} x_{ki}) \times (\Sigma_{k=1 \rightarrow n} x_{ki}/w_{ki})^{-2}$.

The total sum squared error, E, of ANO j is given by $E = \Sigma_{j=1 \rightarrow n}(e_j)^2$.

5.4(a) Gradient Descent in the FEN

Key to the use of BP is the computation of an ANO's error gradient; it is used to determine how to change or modify the node's parameters. As discussed earlier, it is the change in nodal parameters that constitutes learning. Unique to the FEN is its ability to modify the membership functions of the network's nodes. To accomplish this, standard BP techniques have been extended in a novel and nonobvious manner.

Suppose that ANO j has been designated for training. Denote the vector of weights of incoming connections to ANO j by $w_j = (w_{j1}, \ldots, w_{jn})$. The gradient of the sum squared error, $\nabla E$, with respect to $w_j$ is the vector of partials $\nabla E = \partial E/\partial w_{ji} = 2e_j \times (\partial e_j/\partial z_j) \times (\partial z_j/\partial y_j) \times (\partial y_j/\partial x_{ji}) \times (\partial x_{ji}/\partial w_{ji}) = -2e_j \times \phi_j'(y_j) \times \partial \Gamma_j(x_{j1}, \ldots, x_{jn})/\partial x_{ji} \times z_i$.

Thus, changing a weight $w_{ji}$ in the direction of $\nabla E$ will reduce ANO j's total sum squared error. In this case, it should be remembered that $w_{ji}$ in the above equation represents any one of the FEN parameters $a_{ij}$, $b_{ij}$, and $c_i$.

The amount by which $w_{ji}$ is changed during a single step of training is given by a $\Delta w_{ji}$:

$\Delta w_{ji} = \eta \times e_j \times \phi_j'(y_j) \times (\partial \Gamma_j(x_{j1}, \ldots, x_{jn})/\partial x_{ji}) \times z_i + \mu \times \Delta w_{ji}^{old}$.

Here, $\eta$ (learning rate) and $\mu$ (momentum) are learning control parameters introduced to control the size and rate of weight (parameter) modification. This is a standard, albeit ad hoc, technique to control learning in BP networks. The parameter $\Delta w_{ji}^{old}$ represents the value assigned to $\Delta w_{ji}$ during the most recent previous training step.

5.5 Simulation Example

To illustrate the operational and numerical behavior of a FEN consider a nonlinear two-input specified in the following manner:

$$f_q(x_{1q}, x_{2q})=(0.5x_{1q}+x_{2q}^2+\alpha)^2.$$

1. $x_1$ and $x_2$ represent system input variables and are randomly, uniformly, distributed on the closed interval [−1, 1].
2. $\Delta$ a represents an arbitrary free variable and is assigned a fixed value of 2.0 unless otherwise noted.
3. The FEN's training set consists of 20 pairs of input data points ($x_{1q}$ and $x_{2q}$) and the corresponding 20 output values; subscript 'q' designates a particular training data input—$0 \leq q \leq 20$.
4. $F_q(x_{1q}, x_{2q})$ represents the normalized output of $f_q(x_{1q}, x_{2q})$, i.e. lies in the closed interval [0, 1], and is defined by:

$$F_q(x_{1q}, x_{2q})=(f_q(x_{1q}, x_{2q})-\text{MIN}[f_q(x_{1q}, x_{2q})]\div\text{MAX}[f_q(x_{1q}, x_{2q})],$$

where MIN[ ] and MAX[ ] represent the mathematical minimum and maximum functions respectively.

5. A fuzzy rule-base comprised of 16 fuzzy inference rules—four membership functions for each of a rule's two antecedent parts (refer to Section 5.3)— $A_{11}(x_1)$, $A_{12}(x_2)$, $A_{21}(x_1)$, $A_{22}(x_2)$, $A_{31}(x_1)$, $A_{32}(x_2)$, $A_{41}(x_1)$ and $A_{42}(x_2)$—and the corresponding 16 outputs singletons $c_1$ through $c_{16}$:

If $x_1$ is $A_{11}$ and $x_2$ is $A_{12}$ then output $c_1$
If $x_1$ is $A_{11}$ and $x_2$ is $A_{22}$ then output $c_2$
If $x_1$ is $A_{11}$ and $x_2$ is $A_{32}$ then output $c_3$
If $x_1$ is $A_{11}$ and $x_2$ is $A_{42}$ then output $c_4$
.
.
.
If $x_1$ is $A_{41}$ and $x_2$ is $A_{42}$ then output $c_{16}$ 6. Initial values for the parameters $a_{ij}$, $b_{ij}$, and $c_i$ are:

$a_{11}=a_{12}=a_{21}=a_{22}=a_{31}=a_{32}=a_{41}=a_{42}=2.0$; $b_{11}=b_{12}=-0.75$; $b_{21}=b_{22}=-0.25$; $b_{31}=b_{32}=0.25$; $b_{41}=b_{42}=0.75$;

and $c_1$ through $c_{16}=0.5$.

7. The effect of learning—modification of connection weight parameters $a_{ij}$, $b_{ij}$ and $c_{ij}$—will be shown graphically below.
8. An average squared error, E, over the training set of:

$$E=(1/20)\Sigma_{q=1 \to 20}(f_q(x_{1q}, x_{2q})-F_q(x_{1q}, x_{2q}))^2.$$

9. Connection weights of 1 and −1 are not subject to modification.

5.5(a) FEN Learning

As a process, training is implemented as an iteration of the following steps:

1. Presentation of a known input data pair ($x_{1q}$, $x_{2q}$), where $0 \leq q < 20$.
2. Generation of FEN output, $F_q(x_{1q}, x_{2q})$, based on the input of step 1.
3. Calculation of the output's square-error, $E_q$, for the single input of step 1:

$$E_q=(f_q(x_{1q}, x_{2q})-F_q(x_{1q}, x_{2q}))^2.$$

4. Changing the values of $a_{ij}$, $b_{ij}$, and $c_{ij}$ as specified by the equation for $\Delta w_{ji}$ given in Section 5.4(a)—$\Delta w_{ji}$ represents $a_{ij}$, $b_{ij}$, and $c_{ij}$ depending upon which connection weight is being modified (trained).
5. After presemation of all 20 input data points the iteration's total mean square-error, $E_n$, is calculated:

$$E_n=(1/20)\Sigma_{q=1 \to 20}E_q.$$

6. Repeat steps 1 through 5 (e.g., go through another iteration) until the total mean-square-error is less than, or equal to, some specified value.

5.5(b) FEN Learning—Rate

Figure 11:
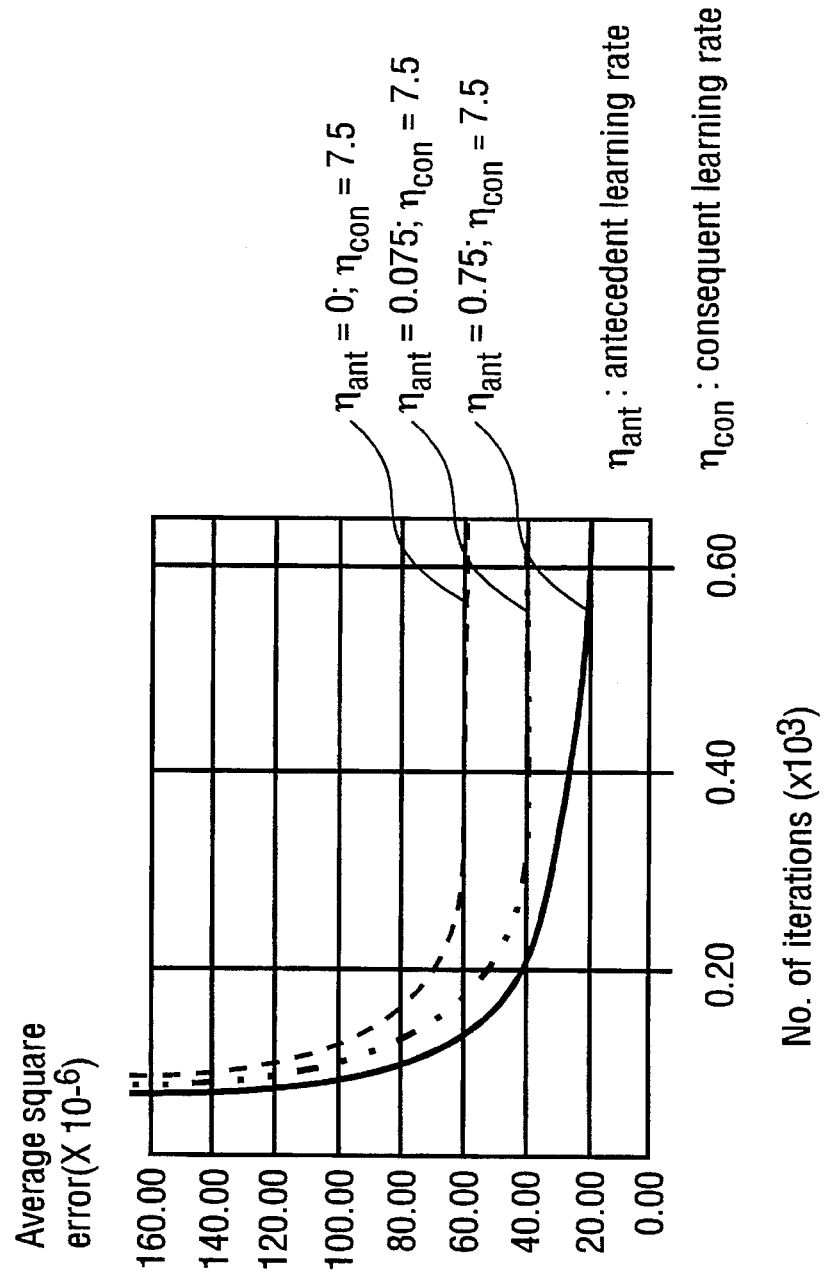
FIG. 11 is a graph of the FEN's mean-square-error output, for various values of the network's learning parameters, as a function of the number of training iterations.

Following the procedure outlined above ($\alpha=2.0$), the FEN's output mean-square-error decreases as a function of the number of iterations through the training set as shown in FIG. 11. Also shown in this figure is the effect different learning rates for the antecedent and consequent parts have on the error reduction rate.

5.5(c) FEN Learning—Adaptability

FEN adaptability is tested in the following manner:
1. Let $\alpha=0$.
2. Perform steps 1 through 5 of Section 5.5(b) until $E_n \leq 0.000225$ (the mean-square-error of an iteration).
3. Let $\alpha=\alpha+0.1$.
4. Repeat steps 2 and 3 of this process until $\alpha=15$ (an arbitrary cutoff point).

Figure 12:
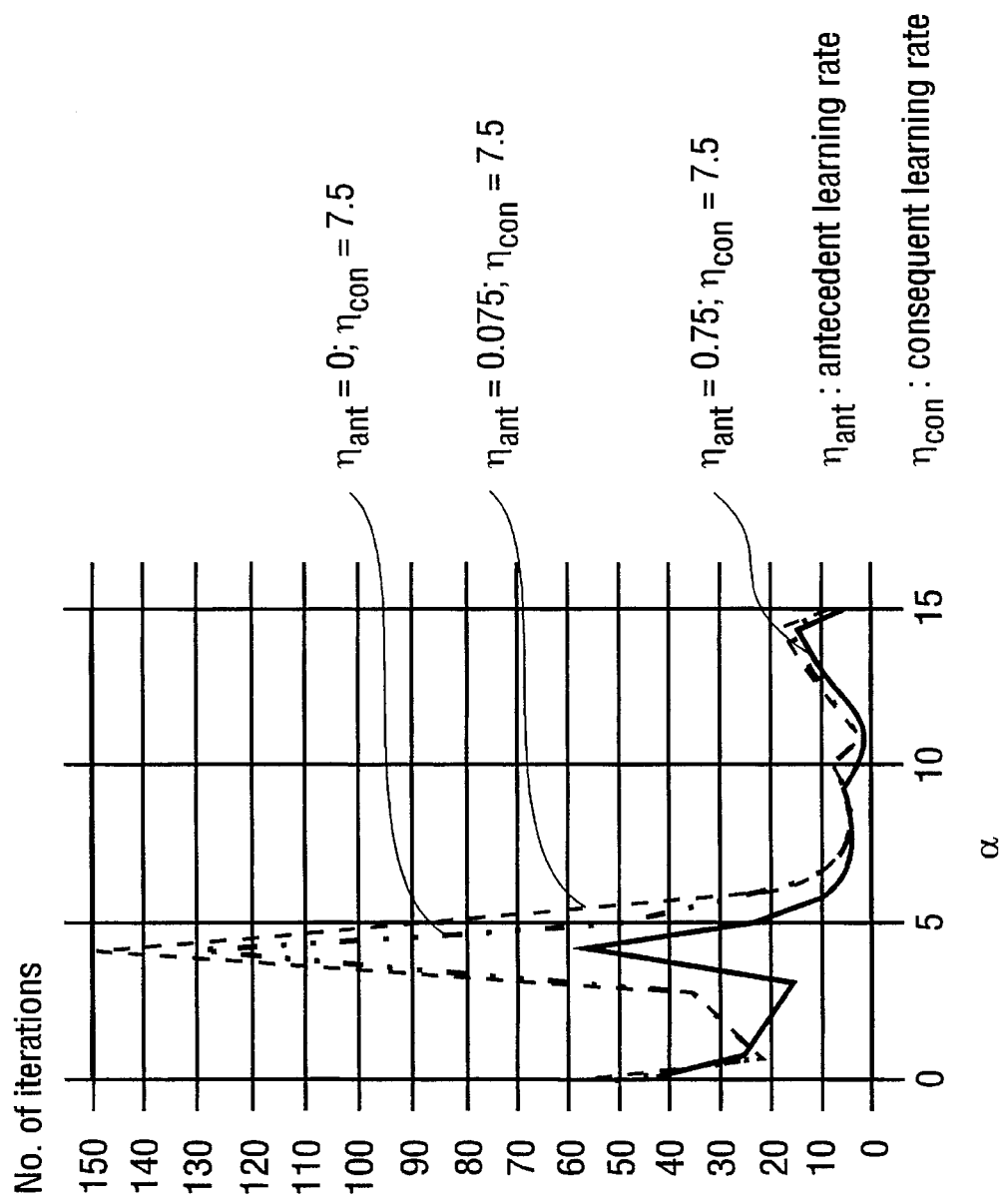
FIG. 12 is a graph of the FEN's adaptability for various values of the network's learning parameters.

FIG. 12 shows the number of iterations required to meet the error threshold of 0.000225 as a function of the parameter $\alpha$. Also shown in this figure is the effect different learning rates for the antecedent and consequent parts have on FEN's adaptability.

5.5(d) FEN Learning—Membership Function

Figure 13:
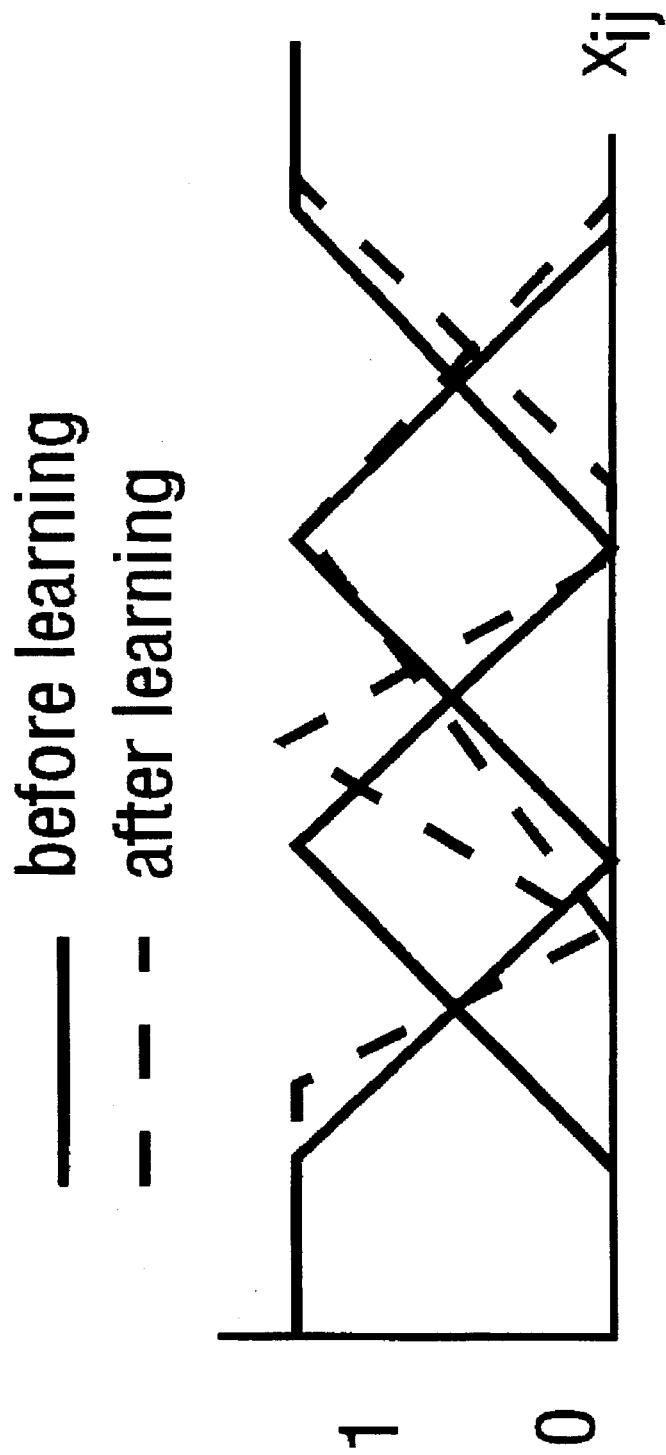
FIG. 13 shows how an example fuzzy rule's membership function changes as a result of training (learning).

The effect training (learning) has on a fuzzy rule's membership function is shown in FIG. 13.

It will be appreciated by those of ordinary skill having the benefit of this disclosure that numerous variations from the foregoing illustration will be possible without departing from the inventive concept described herein, i.e., fuzzy rule base functions having non-symmetric membership functions of the antecedent. Non-fuzzy rule base functions can also be implemented using the neural structures disclosed herein (SUM, LINEAR-THRESHOLD, PRODUCT, and WEIGHTED-SUM-GRAVITY). For example, if $x_1$, $x_2$, $x_3$, and $x_4$ are input variables and variables $a_1$, $a_2$, $a_3$, $a_4$, and b are adjustable (e.g., "weights in a fuzzy expert network), then the function $$f(x_1, x_2, x_3, x_4) = \left( \frac{a_1x_1 + a_2x_2}{x_1 + x_2} \right) \left( \frac{a_3x_3 + a_4x_4}{x_3 + x_4} \right) + b$$

be represented using the SUM, LINEAR-THRESHOLD, PRODUCT, and WEIGHTED-SUM-GRAVITY objects.

Accordingly, it is the claims set forth below, and not merely the foregoing illustration, which are intended to define the exclusive rights claimed in this application.

What is claimed is:

1. An acyclic event-driven expert network of artificial neural objects comprising:

(a) artificial neural object structures connected by weighted connections;

(b) a SUM artificial neural object structure having weighted input signals, x and w, where $x_i$ is the value of the $i^{th}$ input and $w_i$ is a weight associated with input $x_i$, and internal state y calculated by combining function $\Gamma_{sum}(x)$, and an output function $\phi_{sum}(y)$, wherein (1) the internal state of the SUM artificial neural object structure is generated in accordance with the equation:

$$\Gamma_{sum}(x) = y = \sum_{i=1 \to n} x_i$$

and (2) the output of a SUM artificial neural object structure is generated in accordance with the equation:

$$\phi_{sum}(y) = yj$$

(c) a LINEAR THRESHOLD artificial neural object structure having weighted input signals, x and w, where $x_i$ is the value of the $i^{th}$ input and $w_i$ is a weight associated with input $x_i$, and internal state y calculated by combining function $\Gamma_{lin}(x)$, and an output function $\phi_{lin}(y)$, wherein (1) the internal state of the LINEAR THRESHOLD artificial neural object structure is generated in accordance with the equation:

$$\Gamma_{lin}(x) = y = \sum_{i=1 \to n} x_i + 1,$$

and (2) the output of a LINEAR THRESHOLD artificial neural object structure is generated in accordance with the equation:

$$\phi_{lin}(y) = 1 \text{ if } y \geq,$$
$$= y \text{ if } 0 \leq y <,$$
$$= 0 \text{ otherwise};$$

(d) a PRODUCT artificial neural object structure having weighted input signals, x and w, where $x_i$ is the value of the $i^{th}$ input and $w_i$ is a weight associated with input $x_i$, and internal state y calculated by combining function $\Gamma_{prod}(x)$, and an output function $\phi_{prod}(y)$, wherein (1) the internal state of the PRODUCT artificial neural object structure is generated in accordance with the equation:

$$\Gamma_{prod}(x) = y = \prod_{i=1 \to n} x_i$$

and (2) the output of a PRODUCT artificial neural object structure is generated in accordance with the equation:

$$\phi_{prod}(y) = y; \text{ and}$$

(e) a WEIGHTED-SUM-GRAVITY artificial neural object structure having weighted input signals, x and w, where $x_i$ is the value of the $i^{th}$ input and $w_i$ is a weight associated with input $x_i$, and internal state y calculated by combining function $\Gamma_{grav}(x)$, and an output function $\phi_{grav}(y)$, wherein (1) the internal state of the WEIGHTED-SUM-GRAVITY artificial neural object structure is generated in accordance with the equation:

$$\Gamma_{grav[d]}(x) = y = \sum_{i=1 \to n} x_i \div \sum_{i=1 \to n} (x_i/w_i)$$

and (2) the output of a WEIGHTED-SUM-GRAVITY artificial neural object structure is generated in accordance with the equation:

$$\phi_{grav}(y) = y.$$

2. A method for implementing backpropagation learning on the acyclic, event-driven, fuzzy expert network of claim 1, the method comprising the steps of:

(a) applying an example vector input signal E to the fuzzy expert network so that a vector output signal z is produced at the output nodes of the fuzzy expert network;

(b) generating an vector error signal e for assigning an error value to each node in the fuzzy expert network according to an error equation;

(c) generating a new weight vector $w^{new}$ for each node in the fuzzy expert network based on the error value generated in step (b), wherein the new weight vector is generated in accordance with the equation:

$$w^{new} = w^{old} + \Delta w$$

wherein $w^{old}$ is the old weight vector and $\Delta w$ is a vector pointing in the negative direction of the gradient of the error vector e, wherein the negative gradient of the error vector for a node j is calculated according to:

$$-\nabla E = 2e_j \times \phi'(y_j) \times z_i \times \partial \Gamma / \partial x_{ji},$$

wherein $e_j$ is the error value associated with node j and wherein $z_i$ is node i's output value, wherein $x_{ji}$ is defined as the $i^{th}$ input to node j, and wherein $\phi'(y_j)$ and $\partial \Gamma / \partial x_{ji}$ are calculated according to the equation:

(1) for a SUM node $$\phi'(y_j) = 1$$

and $$\partial \Gamma / \partial x_{ji} = 1;$$

(2) for a LINEAR THRESHOLD node $$\phi'(y_j) = 0 \text{ if } y_j > 1$$
$$= 1 \text{ if } 0 < y_j \leq 1$$
$$= 0 \text{ otherwise, and}$$

$$\partial \Gamma / \partial x_{ji} = 1;$$

(3) for a PRODUCT node $$\phi'(y_j) = 1$$

and $$\partial \Gamma / \partial x_{ji} = \prod_{k=1 \to n} x_{jk} \text{ where } k \neq i;$$

(4) for a WEIGHTED-SUM-GRAVITY node $$\phi'(y_j)=1$$

and $$\partial\Gamma/\partial x_{ji}=(\Sigma_{k=1\to n}x_{jk}/w_{jk})^{-1}-(1/w_{ji})\times(\Sigma_{k=1\to n}x_{jk})\times(\Sigma_{k=1\to n}x_{jk}/w_{jk})^{-2}$$

wherein $z_i$ is the output of node i, $w_{ji}$ is the weighted connection between node j and node i, and $x_{ji}$ is the product $(z_i \times w_{ji})$.

3. The method of claim 2 wherein the error signal for an output node j, $e_j$, is generated in accordance with the equation:

$$e_j=I_j-z_j$$

where $I_j$ represents the ideal or desired output from output node j, $z_j$ represents the actual output generated at output node j, and the error signal at a non-output node j is generated in accordance with the equation:

$$e_j=\Sigma_{k=1\to n}\epsilon_{kj}\times e_k,$$

where $e_k$ represents the error value at each node k that receives input from the non-output node j, and $\epsilon_{kj}$ is an error distribution weight that is calculated according to:

$$\epsilon_{kj}=\phi'(y_k)[\partial\Gamma(x_{k1},\ldots,x_{kn})/\partial x_{kj}]w_{kj},$$

where $\phi'(y_k)$ is the derivative of a node k's output function, $\partial\Gamma(x_{k1},\ldots,x_{kn})/\partial x_{kj}$ is the partial derivative of a node k's combining function with respect to the input value node k receives from node j, and $w_{kj}$ represents the weight of the connection between non-output nodes j and k.

* * * * *

UNITED STATES PATENT AND TRADEMARK OFFICE
CERTIFICATE OF CORRECTION

Patent No.: 5,524,176

Dated: June 4, 1996

Inventors: Kazunari Narita and Robert C. Lacher

It is certified that error appears in the above-identified patent and that said Letters Patent are hereby corrected as shown below:

In Column 17, lines 25 and 26, the equation
$$\text{"}\varphi_{sum}(y) = yj\text{"}$$
should read
$$\text{--}\varphi_{sum}(y) = y; \text{--}.$$

In Column 18, lines 10 and 11, the equation
$$\text{"}\Gamma_{grav[d]}(x) = y = \sum_{i=1 \to n} x_i \div \sum_{i=1 \to n} (x_i / w_i)\text{"}$$
should read
$$\text{--}\Gamma_{grav}(x) = y = \sum_{i=1 \to n} x_i \div \sum_{i=1 \to n} (x_i / w_i) \text{--}.$$

Signed and Sealed this

Twenty-fourth Day of September, 1996

Attest:

BRUCE LEHMAN

*Attesting Officer*  *Commissioner of Patents and Trademarks*